(12) United States Patent (10) Patent No.: US 9,841,120 B2
Nicholson (45) Date of Patent: Dec. 12, 2017

(54) DENSITY BASED MECHANICAL VALVE CONTROL SYSTEM

(71) Applicant: M-I L.L.C., Houston, TX (US)

(72) Inventor: Christopher D. Nicholson, Florence, KY (US)

(73) Assignee: M-I L.L.C., Houston, TX (US)

( * ) Notice: Subject to any disclaimer, the term of this patent is extended or adjusted under 35 U.S.C. 154(b) by 220 days.

(21) Appl. No.: 14/372,151

(22) PCT Filed: Jan. 14, 2013

(86) PCT No.: PCT/US2013/021461
§ 371 (c)(1),
(2) Date: Jul. 14, 2014

(87) PCT Pub. No.: WO2013/106843
PCT Pub. Date: Jul. 18, 2013

(65) Prior Publication Data
US 2015/0000751 A1 Jan. 1, 2015

Related U.S. Application Data

(60) Provisional application No. 61/586,193, filed on Jan. 13, 2012.

(51) Int. Cl.
*F16K 31/18* (2006.01)
*F16K 31/20* (2006.01)
(Continued)

(52) U.S. Cl.
CPC ............ *F16K 31/20* (2013.01); *E21B 21/067* (2013.01); *E21B 34/16* (2013.01); *F16K 1/22* (2013.01);
(Continued)

(58) Field of Classification Search
CPC .......... F16K 31/18; F16K 31/20; F16K 31/22; F16K 31/24; F16K 31/26; F16K 31/265;
(Continued)

(56) References Cited

U.S. PATENT DOCUMENTS 719,447 A * 2/1903 Fabian .................... F16K 31/26
137/444
1,344,370 A * 6/1920 Allen ....................... G01N 9/10
210/113
(Continued)

FOREIGN PATENT DOCUMENTS

WO 2005005871 A1 1/2005

OTHER PUBLICATIONS

International Search Report and Written Opinion issued in PCT/US2013/021461 on Apr. 26, 2013, 15 pages.

*Primary Examiner* — William McCalister
*Assistant Examiner* — Ian Paquette
(74) *Attorney, Agent, or Firm* — David J. Smith (57) ABSTRACT

An apparatus for controlling a flow of a fluid, such as a drilling fluid or drilling mud, is disclosed. The apparatus may include: a valve member; and a float member mechanically coupled to the valve member and configured to operate on the valve member when fully submerged in a fluid. The coupled float member is configured to increase flow through the valve member as a density of the fluid decreases and to restrict flow through the valve member as the density of the fluid increases.

4 Claims, 5 Drawing Sheets

(51) Int. Cl.
*E21B 34/16* (2006.01)
*E21B 21/06* (2006.01)
*F16K 1/22* (2006.01)

(52) U.S. Cl.
CPC ......... *F16K 31/18* (2013.01); *Y10T 137/0324* (2015.04); *Y10T 137/7439* (2015.04); *Y10T 137/7481* (2015.04)

(58) Field of Classification Search
CPC .......... F16K 31/30; F16K 31/32; E21B 34/16; E21B 21/067; Y10T 137/7481; Y10T 137/7439; Y10T 137/0324
USPC ............... 137/448, 409, 434, 435, 447, 202; 251/304, 305, 308
See application file for complete search history.

(56) References Cited

U.S. PATENT DOCUMENTS

| | | | |
|---|---|---|---|
| 4,741,358 A * | 5/1988 | Cho | F16K 31/32 137/426 |
| 6,240,954 B1 | 6/2001 | Bereznai | |
| 6,367,547 B1 | 4/2002 | Towers et al. | |
| 2001/0023708 A1* | 9/2001 | Coscarella | E03F 7/04 137/527.8 |
| 2004/0069357 A1* | 4/2004 | Ellacott et al. | F16K 31/563 137/624.27 |
| 2009/0260886 A1 | 10/2009 | Scott | |
| 2012/0000643 A1 | 1/2012 | Bruun et al. | |

\* cited by examiner

DENSITY BASED MECHANICAL VALVE CONTROL SYSTEM

BACKGROUND

When drilling or completing wells in earth formations, various fluids typically are used in the well for a variety of reasons. Common uses for well fluids include lubrication and cooling of drill bit cutting surfaces, transportation of "cuttings" (pieces of formation dislodged by the cutting action of the drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, emplacing a packer, abandoning the well or preparing the well for abandonment, and otherwise treating the well or the formation.

Drill cuttings can originate from different geological strata, including clay, rock, limestone, sand, shale, underground salt mines, brine, water tables, and other formations encountered while drilling oil and gas wells. Cuttings originating from these varied formations can range in size from less than two microns to several hundred microns, including clays, silt, sand, and larger drill cuttings.

After formulating a drilling fluid with desired rheological properties, one challenge during the drilling process is maintaining the properties of the drilling fluid during recycle and reuse. For example, as mentioned above, the drilling fluids transport drilled solids to the surface for screening and disposal. Recycling drilled solids into the wellbore is undesirable, as this can result in smaller sizes of drilled solids which can accumulate in the drilling fluid, ultimately affecting the properties of the drilling fluid. If the solids content increases, additional drilling fluid (water, oil, etc.) and other chemicals must be added to maintain the drilling fluid at its desired density, viscosity, and other physical and chemical properties for the drilling fluid to satisfy the requirements for drilling a wellbore. The drilling fluid and drill cuttings returned to the surface are often separated to maintain drilling fluid weight, thus avoiding costly dilution. The separated solids are then discarded or disposed of in an environmentally accepted manner.

In addition to drill cuttings, the drilling fluid returned to the surface may also contain entrained gases. Gases that may be dissolved in or entrained by the drilling fluid may include methane, hydrogen sulfide, and many other gases released from the formation being drilled. Upon return of the drilling fluid to the surface, such gases must be effectively handled. For example, entrained gases may reduce pumping efficiency. Further, if released from the drilling fluid, methane poses a fire or explosion hazard, and hydrogen sulfide is poisonous in even minute concentrations.

Several types of separation equipment have been developed to efficiently separate dissolved gases and the varied sizes of the weighting materials and drill cuttings from the drilling fluid, including shakers (shale, rig, screen), degassers, screen separators, centrifuges, hydrocyclones, desilters, desanders, mud cleaners, mud conditioners, dryers, filtration units, settling beds, sand traps, and the like. Centrifuges and like equipment can speed up the separation process by taking advantage of both size and density differences in the mixture being separated.

DETAILED DESCRIPTION

In an aspect, embodiments disclosed herein relate to methods and apparatus for controlling the flow of a fluid. More specifically, embodiments disclosed herein relate to control of fluid flow based on the "weight" or density of the fluid. Such control can enhance the performance fluid processing equipment such as separation equipment. Valves according to embodiments herein may also be useful for processing drilling fluids and other fluids where density-based flow regulation would be desired, such as in various portions of chemical plants, refineries, water treatment facilities, etc.

In one aspect, embodiments disclosed herein relate to an apparatus for controlling a flow of a fluid, such as a drilling fluid or drilling mud. The apparatus may include: a valve member; and a float member mechanically coupled via a mechanical coupling to the valve member and configured to operate the valve member. The coupled float member is configured is configured to increase flow through the valve member as a density of the fluid decreases and to restrict flow through the valve member as the density of the fluid increases.

In another aspect, embodiments disclosed herein relate to a method for processing drilling fluid. The method may include: fluidly coupling a valve member with a drilling fluid supply; and moving the float member based on density of the fluid from an open position where fluid flows through the valve member toward a closed position in which the valve member substantially prevents the fluid from flowing through the valve member.

In another aspect, embodiments disclosed herein relate to an apparatus that may include: a valve member; a float member coupled to the valve member; a mechanical coupling operatively connecting the valve member and the float member and configured to move the valve member. The mechanical coupling and the float member are configured to alter a position of the valve member based on a density of a fluid when the float member is submerged in the fluid An apparatus for controlling a flow of drilling fluid or drilling mud according to embodiments disclosed herein may include a valve member and a float member. The float member is mechanically coupled to the valve member and configured to operate on the valve member when fully submerged in a fluid, such as a drilling fluid. During operation, the coupled float member increases flow through the valve member as a density of the drilling fluid decreases, and restricts flow through the valve member as the density of the drilling fluid increases.

Such a density based mechanical valve control system uses a float member that can be fully submerged in the process fluid. As the density of the fluid increases, the fluid exerts increasing force on the float member. The float member is coupled by a linkage to actuate a valve. The linkage (mechanical coupling), which may include at least one of a linear spring and a radial spring, resists the force exerted by the fluid on the float member, balancing the buoyant force with its position. The valve thus opens and closes based on the density of the process fluid, providing flow control through the valve to a piece of equipment for enhanced or optimized performance. Thus, in some embodiments, the float member and the mechanical coupling may be selected to balance the buoyant forces by altering a position of the valve based on fluid density, and may be configured to operate over a range of fluid densities, such as from about 5 pounds per gallon to about 22 pounds per gallon or an intermediate range thereof.

The mechanical coupling and valve actuation mechanism can be either linear or rotational, such as linear with a linear spring, rotational with a rotary spring, or rotational with a linear spring, as shown in FIGS. 1-5. These spring arrangements may be connected by a linkage to virtually any type of valve that is linear or rotary actuated, including butterfly valves. As such, valve systems disclosed herein could be used on or associated with virtually all drilling fluid processing equipment, including degassing equipment, shale shakers, and mud gas separators.

With respect to the mechanical coupling of the float member, a few non-limiting examples are as follows. In one or more embodiments, the valve shaft may be directly coupled to the float arm by use of a key, spline, or threaded shaft. In one or more embodiments, a rotary spring may attach to the float member by hooking around or into a hole or pin in the float arm or similarly by hooking into a slot, pin, or hole in the float wheel; the other end of the spring may attach to a stationary point on the valve body via a hole, slot, pin, or other mechanism.

In another configuration, the spring may act on a secondary spring arm, which is separate from the float arm, both of these arms being attached to the shaft of the valve. In this way, the torque from the float and spring will balance each other. Linear springs may be coupled to the float arm/wheel and body in a similar fashion. The spring mechanism may be contained in a housing to avoid contamination from the process fluid. In the case of a housing around the spring and spring arm, a stationary fastening point could be made integral with the housing (instead of the valve body).

Figure 1:
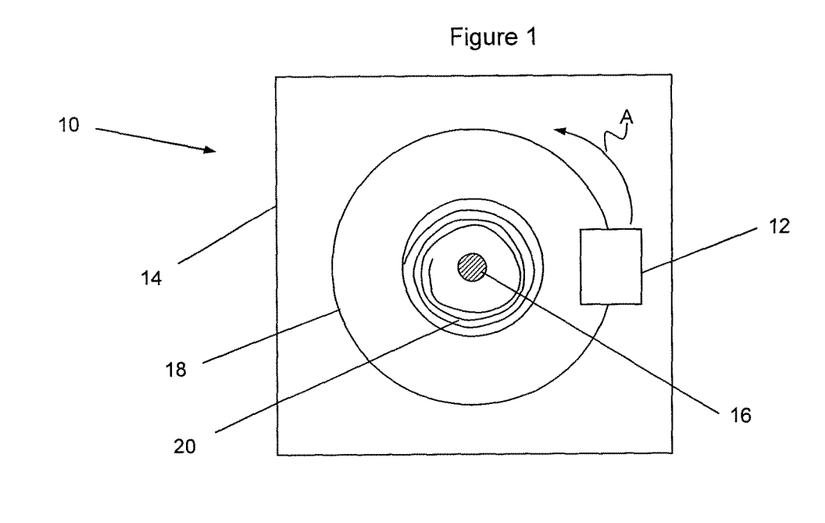
FIG. 1 illustrates a simplified schematic diagram of a density based mechanical valve control system including a rotary wheel according to embodiments disclosed herein.

Referring now to FIG. 1, a density based mechanical valve control system 10 according to embodiments disclosed herein is illustrated. Valve system 10 may include a float member 12 and a valve housing 14, which includes a rotatable valve member (not illustrated). The float member 12 is mechanically coupled to the valve member, such as via rod 16, wheel 18, or a combination thereof. While illustrated with a wheel 18, other linkages, such as an arm, may be used, so long as the linkage spaces the float away from the axis of the valve such that the buoyant force on the float will create sufficient torque to operate the valve.

A rotary spring 20 may be included to apply a desired resistance to the movement of float member 12. As the float member 12 rises along path "A," the spring 20 may apply a force on wheel 18, providing a desired response in the movement of or position of float member 12 with respect to the buoyant forces exerted by the fluid, when the float member is fully submerged in the fluid. In this manner, during operation, the coupled float member may automatically increase flow through the valve member as density of the drilling fluid decreases, and may automatically restrict flow through the valve member as the density of the drilling fluid increases. No external measurement or control is necessary.

Figure 2A:
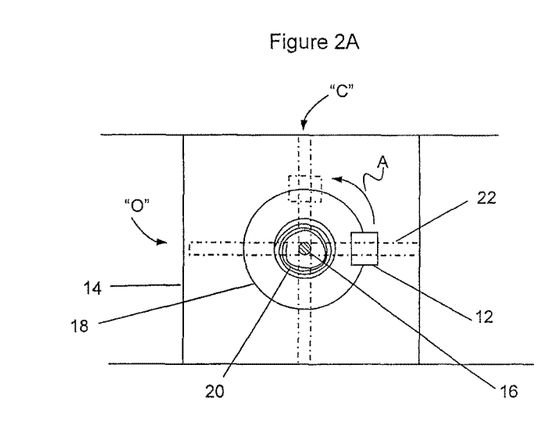
FIG. 2A illustrates a profile view of a simplified schematic diagram of a density based mechanical valve control system including a butterfly valve according to embodiments disclosed herein.
Figure 2B:
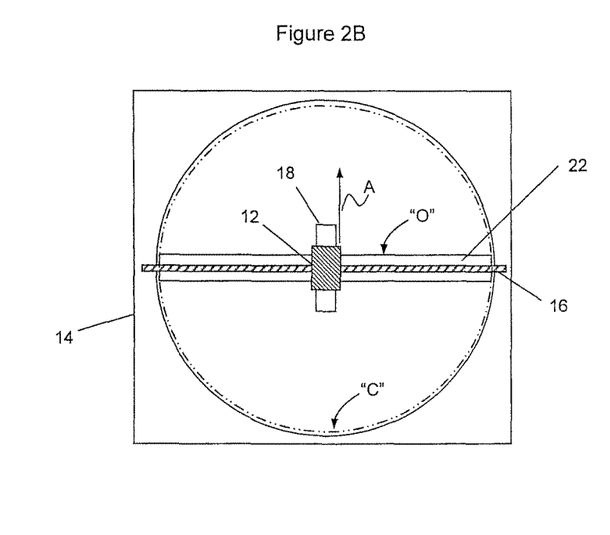
FIG. 2B is an end views of a simplified schematic diagram of a density based mechanical valve control system including a butterfly valve according to embodiments disclosed herein.
Figure 2C:
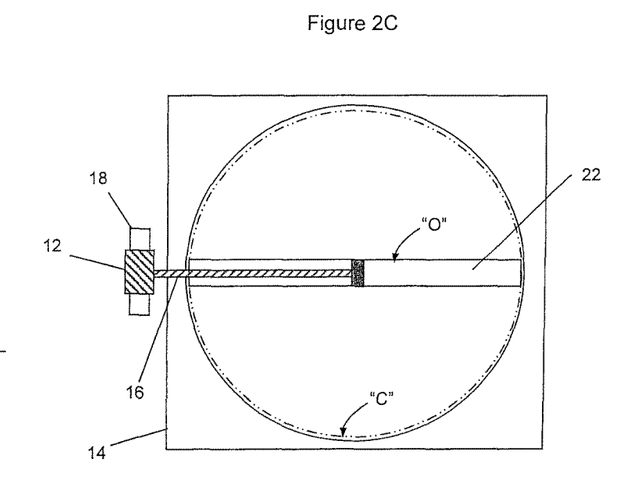
FIG. 2C is an end view of a simplified schematic diagram of a density based mechanical valve control system including a butterfly valve according to an alternate embodiment disclosed herein.

As noted above, the float member 12 may be mechanically coupled to valve member 22, such as via rod 16, the wheel 18, or a combination thereof. Referring now to FIGS. 2A (profile), 2B (end view for one embodiment), and 2C (end view for a second embodiment), wheel 18 may be coupled, for example, to a valve member 22, which may be a butterfly valve. As the density of the fluid increases, float member 12 may be forced upward by the buoyant forces, rotating wheel 18 ninety degrees and therefore rotating butterfly valve member 22 from a fully open position "O" to a fully closed position "C." For a given fluid density, the buoyant forces may provide a degree of openness, providing the desired throttling effect. As illustrated in FIG. 2B, float member 12 and wheel 18 may be located internal to valve housing 14, such as directly coupled to valve member 22, and act in response to the fluid located within the interior portion of valve housing 14. As illustrated in FIG. 2C, float member 12 and wheel 18 may be located external to valve member 22, such as coupled to butterfly valve member 22 via rod 16, acting in response to a fluid external to valve housing 14 in which the float member is submerged.

Figure 3:
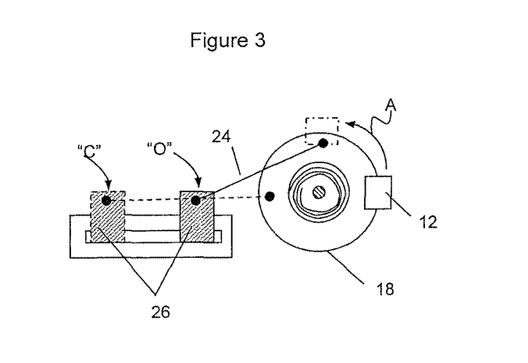
FIG. 3 illustrates a simplified schematic diagram of a density based mechanical valve control system including a slide throttle according to embodiments disclosed herein.

In addition to butterfly valve mechanisms, float member 12 may be connected to virtually any other type of valve actuation mechanisms. As illustrated in FIG. 3, a rod 24 may be used to connect wheel 18 to a slide throttle 26. As the density of the fluid increases, float member 12 may be forced upward by the buoyant forces, rotating wheel 18 ninety degrees and therefore pushing rod 24 and slide throttle 26 from a fully open position "O" to a fully closed position "C." Although a rotation of ninety degrees may move the valve member from a fully open to a fully closed position one of ordinary skill in the art will appreciate that a valve member, a mechanical coupling, and float member may be configured such that a rotation of less than or more than ninety degrees (i.e., 30, 60, or 120 degrees) may move the valve member from fully open position "O" to a fully closed position "C." In some embodiments, use of a slide throttle 26 may allow full actuation of the valve with less than 90 degrees of rotation, which may provide a stable valve response throughout the movement range of the float. This actuation mechanism may also be used to actuate a linear acting valve, similar to a needle or shuttle type valve. As with other embodiments, this actuation mechanism may be rotated up to 90 degrees, such that the actuation motion is vertical, horizontal, or between.

Figure 4:
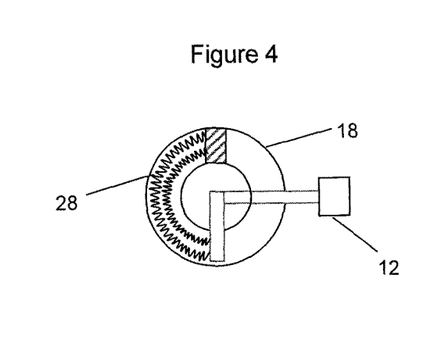
FIG. 4 illustrates a simplified schematic diagram of a density based mechanical valve control system including a linear spring in tension according to embodiments disclosed herein.
Figure 5:
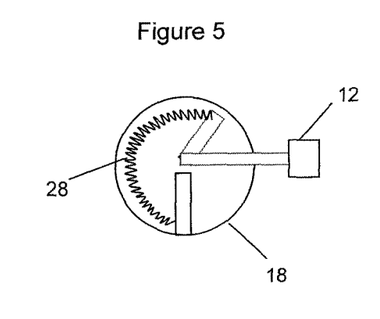
FIG. 5 illustrates a simplified schematic diagram of a density based mechanical valve control system including a linear spring in compression according to embodiments disclosed herein.

The valve systems of FIGS. 1-3 is illustrated with a rotary spring 20. In other embodiments, valve systems may include one or more linear springs 28, which may be used in tension or in compression, such as illustrated in FIGS. 4 and 5, respectively. The linear spring 28 could be attached, for example, to a secondary arm on one end and to a stationary stop on the other end. Both the spring arm and the float arm will be connected to the shaft of the valve. In this way, as the float rises, it will create a torque on the shaft of the valve that will be balanced by a torque from the spring arm. The spring arm may be contained in a housing to prevent contamination from the process fluid. In another configuration, the spring could attach directly to the float arm on one end and to a stationary point on the other end. The stationary point may be integral to the valve body or part of the housing, if one is used. Other configurations including a spring as described above may also be used.

The float member may be coupled to the valve member in a manner to provide a desired valve response. Drilling fluid densities may vary, for example, from about 7 or 8 pounds per gallon to as high as 14 or 15 pounds per gallon, or even greater. Some drilling fluids may have densities as low as 5 or 6 pounds per gallon and as high as 20 to 22 pounds per gallon, for example. Because drilling fluid processing equipment variables and performance may be impacted by the drilling fluid density, the response of the valve may be tailored by the manner in which it is coupled to the float member. For example, it may be desirable to have the flow of drilling fluid through the valve be restricted to a greater extent at low densities (the valve moving toward the closed position over a small range of relatively low fluid densities; i.e., the valve 22 has a "higher response" at lower fluid densities). In other embodiments, it may be desirable to have the flow of drilling fluid through the valve 22 be restricted to a greater extent at only higher densities (the valve remaining essentially open over a range of low fluid densities, moving toward the closed position over a small range of relatively high fluid densities; i.e., the valve having a "higher response" at higher fluid densities). In other embodiments, the float member may be coupled in a manner to provide a substantially linear response over a range of fluid densities. A substantially linear response may be defined as the valve opening or closing in a linear relationship with the fluid density. So as the density changes the valve opens at the same rate as the float moves, i.e., linear relationship.

Figure 6A:
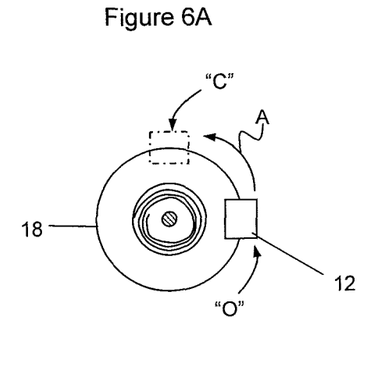
FIG. 6A illustrates a float member to valve member/wheel coupling arrangement for valve systems for reducing the response at higher drilling fluid densities according to embodiments disclosed herein, with the associated valve response curve illustrated in FIG. 6B.
Figure 6B:
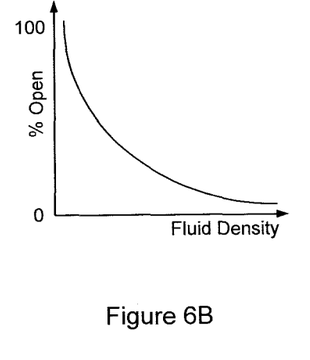

FIG. 6A illustrates one manner of coupling the float member 12 to wheel 18 (alternatively to the valve member 22, as discussed with respect to FIG. 2), where the coupling provides a higher (i.e., quicker) response at higher drilling fluid densities. FIG. 6B, a valve response curve, illustrates the valve response with respect to fluid density associated with the coupling illustrated in FIG. 6A. With the illustrated "side mount" (float located ~90° from vertical, regardless of fluid flow direction) as the mud weight increases, the rotary force (i.e., the rotary component of the buoyant force placed on wheel 18 (valve member 22)) decreases, reducing the response of the valve at higher densities.

Figure 7A:
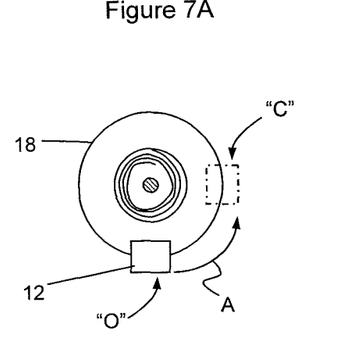
FIG. 7A illustrates another float member to valve member/wheel coupling arrangement for valve systems for increasing the response at higher drilling fluid densities according to embodiments disclosed herein, with the associated valve response curve illustrated in FIG. 7B.
Figure 7B:
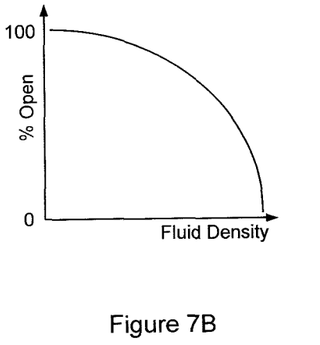

Referring now to FIG. 7A, another manner of coupling the float member 12 to the valve member 22/wheel 18 is illustrated, where the coupling provides a higher (i.e., quicker) response at lower drilling fluid densities. FIG. 7B, a valve response curve, illustrates the valve response with respect to fluid density associated with the coupling illustrated in FIG. 7A. In this "bottom mount" embodiment (float located proximate the bottom or lowermost point of the wheel), at lower mud weights the rotary contribution of the buoyant force will be low, and thus the valve will have a faster response at higher mud densities.

Figure 8A:
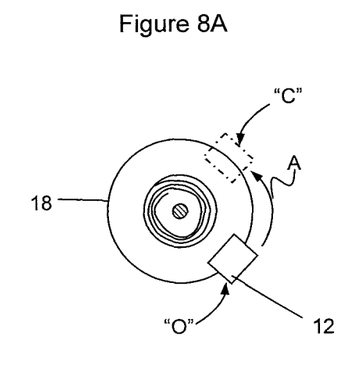
FIG. 8A illustrates another float member to valve member/wheel coupling arrangement for valve systems for linear responses over a range of drilling fluid densities according to embodiments disclosed herein, with the associated valve response curve illustrated in FIG. 8B.
Figure 8B:
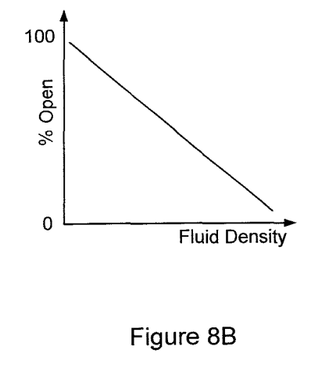

FIG. 8A illustrates another manner of coupling the float member 12 to the valve member 22/wheel 18, where the coupling provides a relatively linear response over a range of drilling fluid densities. FIG. 8B, a valve response curve, illustrates the valve response with respect to fluid density associated with the coupling illustrated in FIG. 8A. In the "angle mount" configuration, such as at about 45° from vertical, the rotary contribution of the buoyant force may be linear or substantially linear across a range of mud weights.

As discussed above with respect to FIGS. 2A-2C, the valve member 22 and float member 12 may be located proximate one another, where both are submerged in the fluid. In such embodiments it may be desirable to limit the interaction with the coupling components (springs, bushings, slides, lever arms, etc.) with the fluid, which may contain solids or corrosive compounds. The coupling components, or portions thereof, may be located in an enclosure to prevent undesired interference of the solids in the drilling fluid with valve operations, such as clogging of the spring with solids, or premature failure of coupling components due to corrosion.

The above described density based mechanical valve control systems may be used to control the flow of fluids, such as drilling fluids, to, during, or between various operations for processing fluids, as noted above, including shakers, degassers, desanders, desilters, and centrifuges. The valve member may be fluidly coupled to a drilling fluid supply in which the float member is fully submerged. The coupled valve member—float member pair, configured to increase flow through the valve member as a density of the drilling fluid decreases and to restrict flow through the valve member as the density of the drilling fluid increases, may then be used to control the flow of the drilling fluid through the valve member. The flow of fluid through the downstream portion of the valve member to the degasser, shaker, desander, desilter, or centrifuge, may thus be properly restricted (controlled) by the float member.

Figure 9:
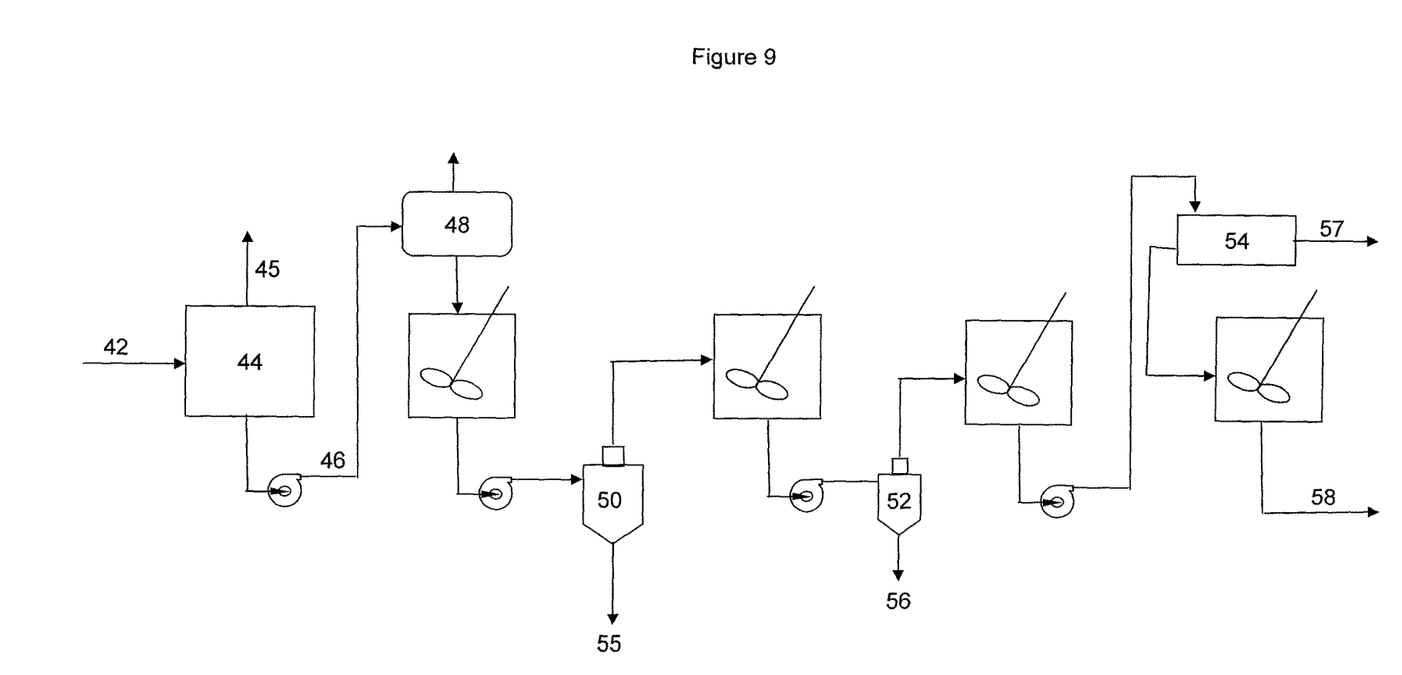
FIG. 9 illustrates a stage-wise separation of drilling fluid according to size classifications in which valve systems according to embodiments disclosed herein may be usefully employed.

For example, a typical process used for the separation of drill cuttings and other solids from drilling fluid is shown in FIG. 9, illustrating a stage-wise separation of the drilling fluid according to size classifications. Drilling fluid 42 returned from the well (not shown) and containing drill cuttings, entrained or dissolved gases, and various additives can be separated in a shale shaker 44, resulting in large particles 45, such as drill cuttings (greater than 500 microns for example), and effluent 46. The drilling fluid and remaining particles in effluent 46 can then be passed through a degasser 48, removing entrained gases; a desander 50, removing sand 55; a desilter 52, removing silt 56; and a centrifuge 54, removing even smaller particles 57. The solids 55, 56, 57 separated, including any weighting materials separated, are then discarded and the clean drilling fluid 58 can be recycled to the drilling fluid mixing system (not shown). Agitated tanks (not numbered) can be used between separation stages as holding/supply tanks. The flow of drilling fluid between these apparatus and/or the associated storage tanks may be controlled using the density based mechanical valve control systems described herein.

Figure 10:
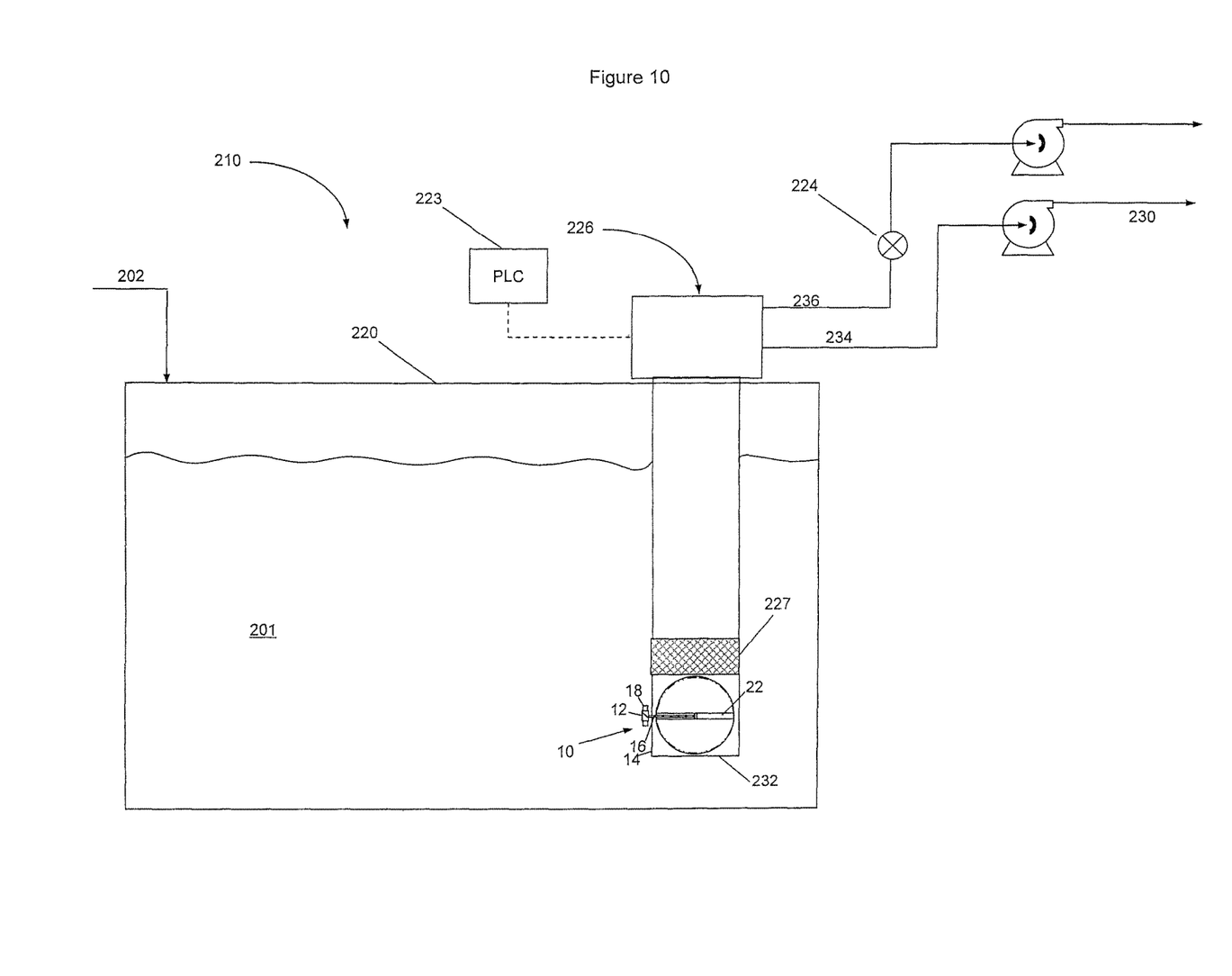
FIG. 10 illustrates a degasser fluidly coupled to a valve system according to embodiments disclosed herein.

The flow of drilling fluid may also be controlled within the processing equipment, such as a degassing module illustrated in FIG. 10. Degassers assist in maintaining the circulating fluid density, and thus aid in maintaining the needed hydrostatic pressure of the well fluid. A degasser, for example, may apply a vacuum to a fluid and subject the fluid to centripetal acceleration. The fluid is then sprayed against a surface, thereby removing entrained air and slowly-evolving bubbles of dissolved formation gases from the circulating fluid before its return downhole or before fluids disposal.

Shown in FIG. 10 is a degassing module 210 in accordance with one embodiment herein. The degassing module 210 is configured to reduce the amount of dissolved and entrained gases from drilling fluid 201, fed via flow line 202. The drilling fluid 201 may be transferred from, for example, a reservoir or another module, such as a shaker. The degassing module 210 may include a tank 220, in which degassing to reduce the amount of dissolved and entrained gases in the drilling fluid is performed. The degassing module 210 may be coupled to a ventilation supply module (not shown) for ventilation of the degassing module 210.

The drilling fluid 201 passes through mechanical degasser 226, wherein centrifugal force is exerted on the drilling fluid 201. The centrifugal force of the mechanical degasser 226 multiplies the force acting on the entrained gas bubbles, for example, methane or hydrogen sulfide, to increase buoyancy of the gas bubbles, thereby releasing an amount of entrained gas bubbles from the drilling fluid. The increase in buoyancy of the gas bubbles accelerates the bubble-rise velocity. As the bubbles rise toward the surface, they escape the drilling fluid.

One commercially available degasser that may be useful in this application is a MI SWACO® CD-1400, available from M-I, LLC (Houston, Tex.). The mechanical degasser 226 may be coupled to the tank 220. Drilling fluid passes through the mechanical degasser 226, which may include an aerator 227, wherein a centrifugal force is exerted on the drilling fluid to facilitate removal of entrained gases from the drilling fluid. The mechanical degasser 226 may be controlled by a programmable logic controller (PLC) 223 that activates the mechanical degasser 226 once the level of drilling fluid in the tank 220 reaches a predetermined level for safe operation of mechanical degasser 226. At least one blower 224 may be coupled to the mechanical degasser 226 to extract gas removed from the drilling fluid. In one embodiment, entrained gases may be removed and sent to a gas treatment module (not shown), a storage (not shown), a flare (not shown) or released into the atmosphere a safe distance so as to avoid contact of any dangerous gasses with personnel (if allowed by local regulatory authorities). Once the entrained gas concentration of the drilling fluid has reached a predetermined concentration, the drilling fluid may be transferred or flowed via flow line 230 to another module (not illustrated) for further processing or to the mud recirculation system (not illustrated) for reinjection downhole.

It has been found that operation of various apparatus used to process the drilling fluid or drilling muds, including the degasser 226 described above with respect to FIG. 10, is limited at very high mud weights (high drilling fluid densities), and very high processing rates for returned drilling fluid. For example, loads on a centrifugal degasser motor are primarily based on the mud weight and the processing rate. For very high mud weights and very high processing rates, the current draw can become excessive and trip the overload circuits. However, it is an important aspect of the drilling process that the degasser functions reliably and efficiently to remove entrained gases, and thus it is undesirable to trip the overload circuits. As illustrated in FIG. 10, embodiments of the density based mechanical valve control systems 10 disclosed herein may be used to automatically throttle the flow rate of drilling mud from tank 220 into the degasser 226 based on mud density, reducing the likelihood of tripping the overload circuits. Degasser 226 has a drilling fluid inlet 232, a degassed drilling fluid outlet 234, and a gas outlet 236. A mechanical flow control system 10 according to embodiments disclosed herein may be fluidly coupled to the drilling fluid inlet 232, or as illustrated may be integral with drilling fluid inlet 232. As described above, the float member is configured to (a) increase flow of drilling fluid from tank 220 through the valve member to the degasser as a density of the drilling fluid decreases, and (b) restrict flow of drilling fluid from tank 220 through the valve member to the degasser as the density of the drilling fluid increases. In this manner, the flow of drilling fluid to the degasser 226 may be regulated to prevent both high processing rates and high drilling mud densities, avoiding the placement of excessive loads on the degasser motor.

Embodiments described herein, include an apparatus having a valve member and a float member mechanically coupled via a mechanical coupling to the valve member and configured to operate the valve member. The mechanically coupled float member may be configured to increase flow through the valve member as a density of the fluid decreases and to restrict flow through the valve member as the density of the fluid increases. The float member and mechanical coupling may be configured to operate the valve member when the float member is fully submerged in the fluid. In some embodiments, the mechanical coupling may further include a rotating wheel or a rotating arm coupled to the float member, the rotating wheel or rotating arm configured to move the valve member in response to a buoyant force acting on the float member. In other embodiments, the mechanical coupling may include at least one of a linear spring and a radial spring configured to resist a buoyant force acting on the float member. In some embodiments, the mechanical coupling may further include a rotating wheel and a slide throttle coupled by a rod to the rotating wheel, the slide throttle may be configured to move the valve member in response to a buoyant force acting on the float member. The valve member may be a butterfly valve. The float member may be coupled to the rotating wheel or rotating arm at a location substantially 90° from vertical in an initial position, proximate the lowermost point of the mechanical coupling in an initial position or in a manner to provide a substantially linear response over a range of fluid densities. In some embodiments the mechanical coupling, or portions thereof, may be located in an enclosure configured to prevent interference of valve operations by solids in the fluid, to prevent corrosion of coupling components, or both. The valve member may be configured to move faster in response to a buoyant force acting on the float member in a high density fluid than in a lower density fluid or configured to move faster in response to a buoyant force acting on the float member in a low density fluid than in a higher density fluid.

Alternate embodiments described herein also include a method of fluidly coupling a fluid supply to a valve member. The valve member may also be mechanically coupled via a mechanical coupling to a float member. The float member may move, based on density of the fluid, from an open position, where fluid flows through the valve member, toward a closed position, in which the valve member substantially prevents the fluid from flowing through the valve member. The method may further include fully submersing the float member in the fluid. In some embodiments, the coupled float member increases flow through the valve member as a density of the fluid decreases and restricts flow through the valve member as the density of the fluid increases. In some embodiments, a change in density moves the float member in response to a change in a buoyant force acting on the float member, thereby moving the mechanical coupling which moves the valve member. In yet other embodiments, the float member and one or more mechanical coupling components are selected to operate the valve member over a density range of about 5 lb/gal to about 22 lb/gal.

Embodiments disclosed herein also include an apparatus having a valve member; a float member coupled to the valve member; and a mechanical coupling operatively connecting the valve member and the float member configured to move the valve member. The mechanical coupling and the float member may be configured to alter a position of the valve member based on a density of a fluid when the float member is submerged in the fluid. In some embodiments, the apparatus further includes a housing disposed around the mechanical coupling or a portion thereof. In other embodiments, the mechanical coupling is configured to resist a force exerted by the fluid on the float member in response to an increased density of the fluid.

As described above, mechanical based valve control systems according to embodiments disclosed herein advantageously throttle flow of a fluid with increasing fluid density. The flow of drilling fluid through such valve systems is thereby performed without need for electronic systems, which may not be suitable for hazardous or harsh environments, or which may be costly to adapt to the necessary electrical classification for placement in such environments. The mechanical based valve systems disclosed herein may be placed in virtually any environment and may function in such environments reliably and predictably.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed:

1. An apparatus comprising:
   a valve member; and
   a float member mechanically coupled via a mechanical coupling to the valve member and configured to operate the valve member, wherein
   the mechanically coupled float member is configured to increase flow through the valve member as a density of fluid decreases and to restrict flow through the valve member as the density of the fluid increases,
   the mechanical coupling comprises at least one of a linear spring and a radial spring configured to resist a buoyant force acting on the float member,
   the buoyant force generates a first torque applied to the valve member via the float member, the at least one of the linear spring and the radial spring generates a second torque opposing the first torque,
   the first and second torques balance to maintain a degree of openness of the valve member, and
   the degree of openness of the valve member is related to changing density of the fluid, and further wherein
   the apparatus is (i) more responsive to the changing density of the fluid when the valve member is closer to a fully open position, relative to when the valve member is closer to a fully closed position or (ii) more responsive to the changing density of the fluid when the valve member is closer to a fully closed position, relative to when the valve member is closer to a fully open position.

2. The apparatus of claim 1, wherein the mechanical coupling further comprises a rotating wheel or a rotating arm coupled to the float member, the rotating wheel or rotating arm configured to move the valve member in response to the buoyant force.

3. The apparatus of claim 1, wherein the mechanical coupling further comprises a rotating wheel and a slide throttle coupled by a rod to the rotating wheel, the slide throttle configured to move the valve member in response to the buoyant force.

4. The apparatus of claim 1, wherein the at least one of the linear spring and the radial spring is disposed at least partially around an axis of rotation of the mechanical coupling.

* * * * *